[19] United States Patent
Christensen et al.

[11] Patent Number: 5,920,438
[45] Date of Patent: Jul. 6, 1999

[54] PROGRAMMABLE DIGITAL CENTERLINE TRACKING THRESHOLD APPARATUS AND METHOD

[75] Inventors: Eric Rolf Christensen; Robert Allen Hutchins, both of Tucson, Ariz.; Ara Sarkis Patapoutian, Westboro, Mass.

[73] Assignee: International Business Machines Corporation, Armonk, N.Y.

[21] Appl. No.: 09/116,037

[22] Filed: Jul. 15, 1998

Related U.S. Application Data

[62] Division of application No. 08/780,552, Jan. 8, 1997, Pat. No. 5,877,644.

[51] Int. Cl.$^6$ .................................................. G11B 5/09
[52] U.S. Cl. .............................. 360/46; 369/59; 369/124; 369/44.35
[58] Field of Search ........................ 369/59, 124, 44.34, 369/44.35, 44.36, 44.29, 54; 360/51, 39, 53, 45, 46

[56] References Cited

U.S. PATENT DOCUMENTS

| | | | |
|---|---|---|---|
| 5,101,395 | 3/1992 | Cardero et al. | 369/59 |
| 5,315,284 | 5/1994 | Bentley et al. | 340/146.2 |
| 5,363,100 | 11/1994 | Bailey et al. | 341/132 |
| 5,495,368 | 2/1996 | Blatchley et al. | 360/46 |
| 5,502,711 | 3/1996 | Clark et al. | 369/124 |
| 5,508,855 | 4/1996 | Hutchins et al. | 360/46 |
| 5,530,601 | 6/1996 | Hutchins et al. | 360/46 |
| 5,629,914 | 5/1997 | Clark et al. | 369/59 |

*Primary Examiner*—Thang V. Tran
*Attorney, Agent, or Firm*—John H. Holcombe; Robert M. Sullivan

[57] ABSTRACT

Disclosed are a programmable digital device and method for generating tracking threshold signals for qualification of input peak signals in response to programmed digital gain signals which control the rate at which the envelope of the qualified input peak signals is followed, and in response to a programmed digital attenuation signal which determines the proportion of the peak envelope at which to generate new tracking threshold signals. The programmable digital device and method also provide a programmed clamp signal to clamp the positive and negative threshold signals to not fall below the programmed values. An anti-hang capability is provided to allow the thresholds to drop after a programmed time period during which no signal is detected. In an alternative arrangement, the centerline of the envelope is followed and used as the threshold.

2 Claims, 4 Drawing Sheets

PROGRAMMABLE DIGITAL CENTERLINE TRACKING THRESHOLD APPARATUS AND METHOD

This is a Divisional application of Ser. No. 08/780,552, filed Jan. 8, 1997, now U.S. Pat. No. 5,877,664.

TECHNICAL FIELD

This invention relates to tracking threshold apparatus and methodology for the detection of signal waveforms, and, more particularly, to digital tracking threshold apparatus and methodology.

BACKGROUND OF THE INVENTION

Data storage systems, whether magnetic or optical, typically store the data in the form of transitions between two stable magnetic or optical states. The data is retrieved by a read head which typically senses the magnetic transitions or the two optical states by providing an analog pulse-type signal, which is amplified and filtered. The analog signal typically comprises positive-going and negative-going alternating pulses or positive-going and negative-going alternating edges. The data is represented by the location, or the timing, of the pulses. The peak is normally the best indicator of the center of the pulse for magnetic tape data and for pulse position modulation (PPM) optical data, and is therefore used to detect the data. Optical pulse width modulation data (PWM) is represented by the length of a pulse, the positive-going "front" edge of the pulse comprising a "1", the negative-going "back" edge of the pulse comprising a "1", and each clock time with no pulse edge comprises a "0".

The analog signal is sampled and converted into a digital signal by an analog to digital (A/D) converter. The digital samples are then utilized for processing to determine the presence of binary "ones" and "zeroes" in the sensed data. In the case of magnetic media, each peak, whether positive or negative, represents a transition and is a binary "one". Each clock cycle between transitions, that is without a transition, is a binary "zero". In the case of optical media, either pulse position modulation or pulse width modulation is used. In pulse position modulation (PPM), a full optical laser pulse comprises a single binary "one", and is represented by only the positive-going peak and not by the negative-going peak. Pulse width modulation (PWM) is represented by the length of a pulse more analogous to magnetics, where a binary "one" is represented by the beginning of the optical laser pulse, a positive-going edge, and by the end of the optical laser pulse, a negative-going edge.

The peaks representing the magnetic transitions or PPM pulses, and edges representing the PWK edges are typically identified and then must be compared to a threshold or threshold envelope to "qualify" the identified peak or edge as having sufficient amplitude that it is data and not noise. The threshold value is designed to be a fraction of the nominal peak value, and is typically set at about 50 percent of the nominal peak. A fixed system may miss peaks or interpret noise as a peak as a result of signal amplitude variation or baseline wander. Sources of signal amplitude variation and baseline wander may occur in many ways. For example, in a magnetic tape system, variations in signal amplitude may occur as a result of the magnetic tape lifting off the read head due to particles or artifacts located on the magnetic tape. Vibrations and other conditions may also cause the magnetic tape to lift off the read head. In an magneto-resistive (MR) head, debris or an asperity on the tape may strike the head, resulting in a thermal spike which causes an additive offset to the signal from a change in the resistance.

Hence, some magnetic signal peak detectors have circuits for providing an adjustable threshold value.

An example of an adjustable threshold circuit is coassigned U.S. Pat. No. 5,363,100, Bailey, et al., issued Nov. 8, 1994. The patent describes a hybrid analog-digital method using pattern lengths to select gains and adjust currents for generating a tracking threshold.

An example of a digital adjustable threshold circuit is coassigned U.S. Pat. No. 5,530,601, Hutchins et al., issued Jun. 25, 1996. The patent shows that a threshold value for a selected peak is established utilizing a prior threshold value associated with a prior peak set off by a number of spaces. The circuit thus filters the truncated waveform with a given delay to generate a tracking threshold. The tracking threshold is suitable for a single media type and single type of data to reduce the errors in peak detection which occur as a result of signal amplitude variations.

Removable media, whether magnetic or optical, are subject to variability. The variability may comprise inconsistencies between manufacturers of the media. The variability may comprise the use of either PWM or PPM media in the same drive. Two types of recording are now being proposed for use on the same medium, or the use of two recording media on the same substrate, allowing for variability within the same medium. The variability may also arise from modernization of the media. The variability of the media most often appears in the variability of the transitions and therefore the variation in amplitudes and offset of the peaks of the data to be detected.

In addition, recording codes can have variability. Most recording methods, such as optics or magnetics, increase the apparent data capacity by the use of more advanced recording codes which have increased length and which incorporate long strings of "zeroes". The conventional threshold tracking circuits, above, would have to be altered to change the time constants to fit the longer codes so as to avoid having the threshold amplitude decrease to the level that, without the alteration, noise would be detected as data. On the other hand, should data stop, the tracking circuit should not get "hung" at a high level.

Lastly, the media may have variations in the type of data stored which causes the envelope to increase or decrease at different rates.

What is needed is adaptable threshold tracking which detects the peaks of the data stream and additionally can be easily upgraded, altered or changed while in use to be able to handle variability of media and of recording without artifically "hanging".

SUMMARY OF THE INVENTION

Disclosed are a programmable digital apparatus and methodology for generating tracking threshold signals for qualification of input peak or edge signals which comprise providing programmed digital gain signals to control the rate at which to follow the envelope of the qualified input signals, and providing a programmed digital attenuation signal to determine the proportion of the peak envelope at which to generate new threshold signals.

The programmable digital apparatus and methodology also provide a programmed clamp signal to clamp the positive and negative threshold signals to not fall below the programmed values with an "anti-hang" capability to allow the thresholds to drop after a programmed time period during which no signal is detected.

In an alternative arrangement, the centerline of the envelope is followed, based on the input peak signals and used as the threshold.

For a fuller understanding of the present invention, reference should be made to the following detailed description taken in conjunction with the accompanying drawings.

DETAILED DESCRIPTION OF THE INVENTION

Figure 1:
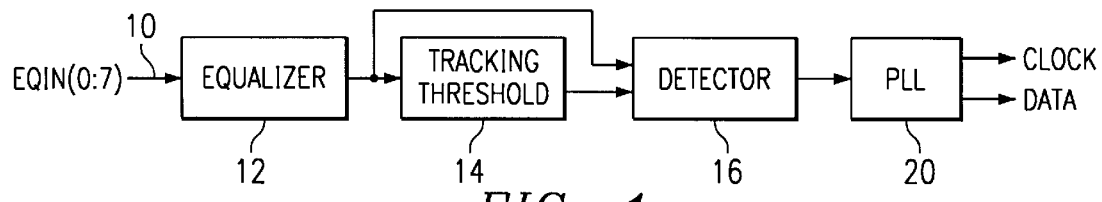
FIG. 1 is a high level block diagram of bit stream data recovery channel which incorporates the programmable digital tracking threshold implementation of the present invention.

Referring to FIG. 1, a high level block diagram of a bit stream data recovery channel is shown. The channel may be one of many parallel tape channels, or a single serial optical channel. The read channel receives data which has been read by a read head, sampled at specific clock times, and the samples converted to digital signals (EQIN) representative of the positive or negative amplitude of the analog signals when sampled.

The digital signals are provided at input 10 to equalizer 12, which, for magnetic and optical is employed to provide digital pulse shaping. The equalized signals are provided to envelope tracking threshold device 14 and to detector 16. As will be explained, envelope tracking threshold device 14 determines the amplitudes of the threshold at which data is separated from noise levels. The threshold levels and the equalizer output are supplied to the detector 16 which detects positive and negative peaks or edges in the equalized signals. The peaks or edges so detected are "qualified" as data peaks and not noise. The output of detector 16 is provided to phase locked loop (PLL) 20. The PLL is digital and detects the data clock rates from the received data to determine the clocking of the signals detected by detector 16, passing the clock and data to decoding circuitry. Equalizer 12, detector 16 and PLL 20 comprise no part of the present invention.

The peak detection methology is designed most appropriately for magnetics and PPM optical, and the same description is valid for transitions or edges for PWM. Hence, "peak" or "transition" detector 16 will be called a peak detector but is understood by one of ordinary skill in the art to similarly detect the location of the edges or transitions.

Figure 2:
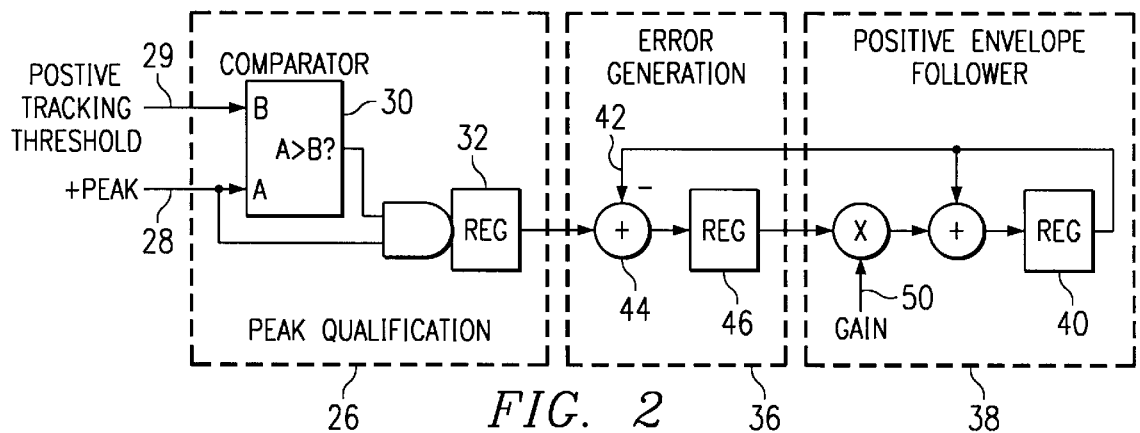
FIG. 2 is a block diagram of a programmable digital positive envelope follower illustrating the present invention.

FIG. 2 is a block diagram of a programmable digital positive envelope follower of the present invention.

The initial "qualification" of positive peaks by the tracking threshold 14 is illustrated generally in block 26. An examplary peak identifier will be described with respect to FIG. 8. Briefly, the identified positive peak signal on lines 28 is compared to the existing positive tracking threshold signal on lines 29 by comparator 30. If the positive peak signal is less than the existing positive tracking threshold signal, it is considered a noise peak and is not qualified. If the positive peak is greater than the existing positive tracking threshold, the peak is considered a data peak and is qualified for threshold processing. Comparator 30 provides a gate signal to gate the identified positive peak signal from lines 28 to register 32. Register 32 therefore stores the digital amplitude of the latest qualified peak.

Blocks 36 and 38 comprise an illustration of the programmable tracking envelope follower of the present invention. Once qualified for threshold processing, the peak is provided to error generation block 36 for comparison to the value stored in the positive envelope follower 38. Specifically, the positive envelope follower value stored in register 40 is supplied on lines 42 to be subtracted in summing circuit 44 from the qualified peak value from register 32.

For the positive envelope follower, if the peak is greater than the value stored in the envelope follower, a positive error is generated. Likewise, if the peak is less than the value stored in the envelope follower, a negative error is generated. The error is provided to register 46.

This error, positive or negative, is multiplied by a programmable gain coefficient supplied on lines 50 and added to the value stored in the envelope follower to thereby update the envelope follower.

This programmable gain coefficient provides one of the means of the present invention for easily upgrading or altering the tracking thresholding or changing it while in use to be able to handle variability of media and of recording.

Figure 3:
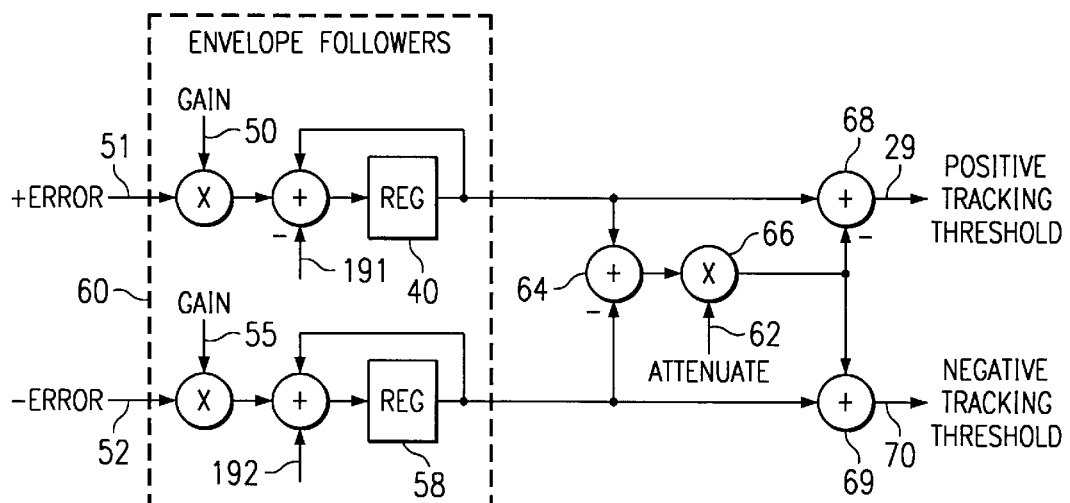
FIG. 3 is a block diagram of a programmable digital tracking threshold follower of the present invention.

FIG. 3 is a block diagram of a programmable digital positive and negative envelope tracking threshold device of the present invention. In order to detect data reliably, the envelope tracking threshold device must be able to track the data through a wide range of dynamic conditions including offset variations and amplitude variations. It must be able to lock quickly onto the data and it must not get "hung" in undefined states as will be described hereinafter.

Block 60 in FIG. 3 illustrates both positive and negative envelope followers for following the positive and negative qualified peaks of the input peak signal as illustrated with respect to the positive envelope follower of FIG. 2.

Specifically, the positive envelope following error on lines 51, positive or negative in value, is multiplied by the programmable gain coefficient supplied on lines 50 and added to the value stored in the positive envelope follower register 40 to thereby update the envelope follower. Similarly, the negative envelope following error on lines 52, positive or negative in value, is multiplied by a programmable negative gain coefficient supplied on lines 55 and added to the value stored in a negative envelope follower register 58 to thereby update the envelope follower.

The output of register 58 is also supplied to a negative error generation circuit similar to error generation circuit 36 in FIG. 2, where the error with respect to the next qualified negative envelope peak is determined and supplied on lines 52.

The envelope following gains 50 and 55 are programmed to control the rate at which the envelope followers follow the input peak envelope. A high gain results in faster and closer following of the input peaks and a low gain results in slower, lagging following of the input peaks. To change the envelope following while in use, the polarity of the envelope error may be monitored and programmed gains can be selected to increase (attack) the envelope follower or decrease (decay) the envelope follower. The gains 50 and 55 are normally the same, but can be programmed differently if desired.

The envelope following gain coefficients vary between acquisition and tracking modes which can range from 0.2 to 0.8 and typically are 0.5.

Still referring to FIG. 3, the thresholds of the programmable envelope tracking threshold device of the present invention are set at a programmable proportion of the peak levels by a programmable attenuation factor supplied at input 62.

This programmable attenuation coefficient provides another of the means of the present invention for easily upgrading or altering the tracking thresholding or changing it while in use to be able to handle variability of media and of recording.

The positive and negative tracking thresholds are generated by determining the absolute value between the positive and negative envelope following values, respectively of register 40 and of register 58. In the embodiment shown, the absolute value is determined by calculating the difference between the negative envelope value signal and the positive envelope value signal in digital calculating circuit 64. If, as is generally the case, the sign of the negative envelope value signal is negative, the values of the registers 40 and 58 are effectively added to provide the absolute value therebetween.

This absolute value total difference is then multiplied by the programmed attenuation factor supplied on lines 62 by calculation circuit 66. The attenuated difference signal represents a fraction of the average peak-to-peak amplitude. The attenuated difference signal is then subtracted from the positive envelope following value signal at calculation circuit 68 and added to the negative envelope following value signal at calculation circuit 69. Thus, an attenuation factor of 0.25, will provide a digital signal to circuits 68 and 69 whose value is equal to 0.25 times the total difference between the positive and negative envelopes. If the envelope values are opposite, but equal, the result of the subtraction at circuit 68 will be 0.5 times the positive peak envelope following value, and the result of the addition at circuit 69 will be 0.5 times the negative peak envelope following value.

The attenuation factor controls the level below the envelope following value at which data peaks are differentiated from noise, with the data peaks the larger value.

The result provided by circuit 68 is the positive tracking threshold and the result provided by circuit 69 is the negative tracking threshold. The new positive tracking threshold is provided on lines 29 to the positive peak qualification block 26 in FIG. 2, and to the detector 16 in FIG. 1. The new negative tracking threshold is provided on lines 70 to a negative peak qualification block and to detector 16. The new tracking thresholds are provided to the qualification blocks then used to qualify later identified peaks of the input signal.

A normal tracking threshold is 0.5, requiring an attenuation factor of 0.25, and a suitable range of values is 0.3 to 0.7.

Figure 4:
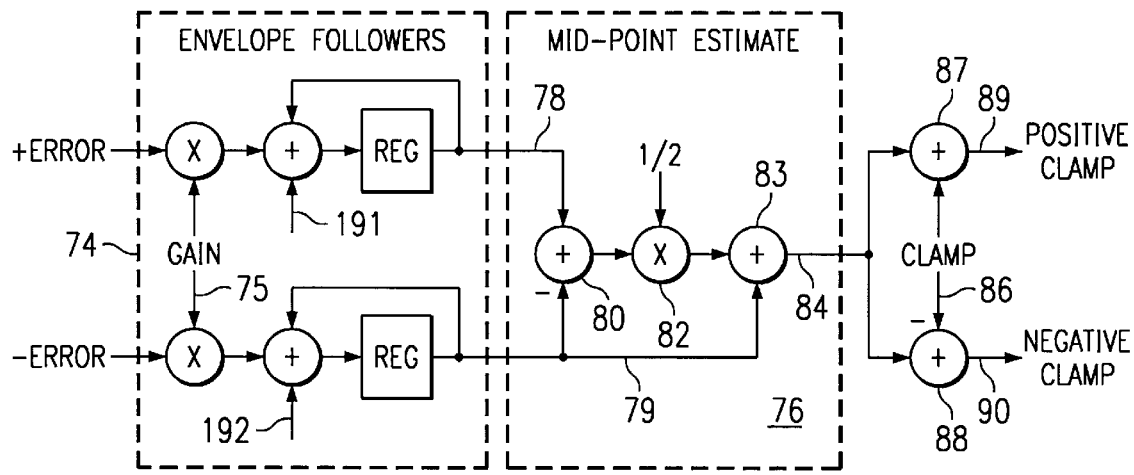
FIG. 4 is a block diagram of a programmable clamp of the present invention.

FIG. 4 comprises a clamping arrangement for the tracking thresholds. In a peak detection system, if a significant loss in signal occurs, the detector should be disabled to prevent the detection of noise rather than data. The arrangement of FIG. 4 generates a programmable "clamp" level to disable the detection during the event of significant signal loss.

The envelope followers in block 74 are identical to those of block 60 in FIG. 3, with the exception that a single envelope following gain 75 is shown. The single envelope following gain is a suitable alternative embodiment to the dual envelope following gain of FIG. 3.

The arrangement of block 76 in FIG. 4 provides a mid-point estimate comprising the approximate mid-point between the positive envelope following value on lines 78 and the negative envelope following value on lines 79. In the same manner as with respect to the calculation circuit 64 in FIG. 3, calculation circuit 80 in FIG. 4 determines the total difference between the positive envelope follower value and the negative envelope follower value.

This total difference is then divided by two at calculation circuit 82 and added to the negative envelope following value at calculation circuit 83. The resultant output on lines 84 comprises the mid-point value half way between the two envelope followers. If the positive and negative envelope following values are opposite and equal, the mid-point value is the baseline.

A programmable digital "clamp" level is provided at lines 86 and is added to the mid-point value by calculation circuit 87 and subtracted from the mid-point value by calculation circuit 88. The resultant clamp levels are of equal positive and negative amplitudes about the mid-point value, and are provided respectively on lines 89 and 90.

Figure 5:
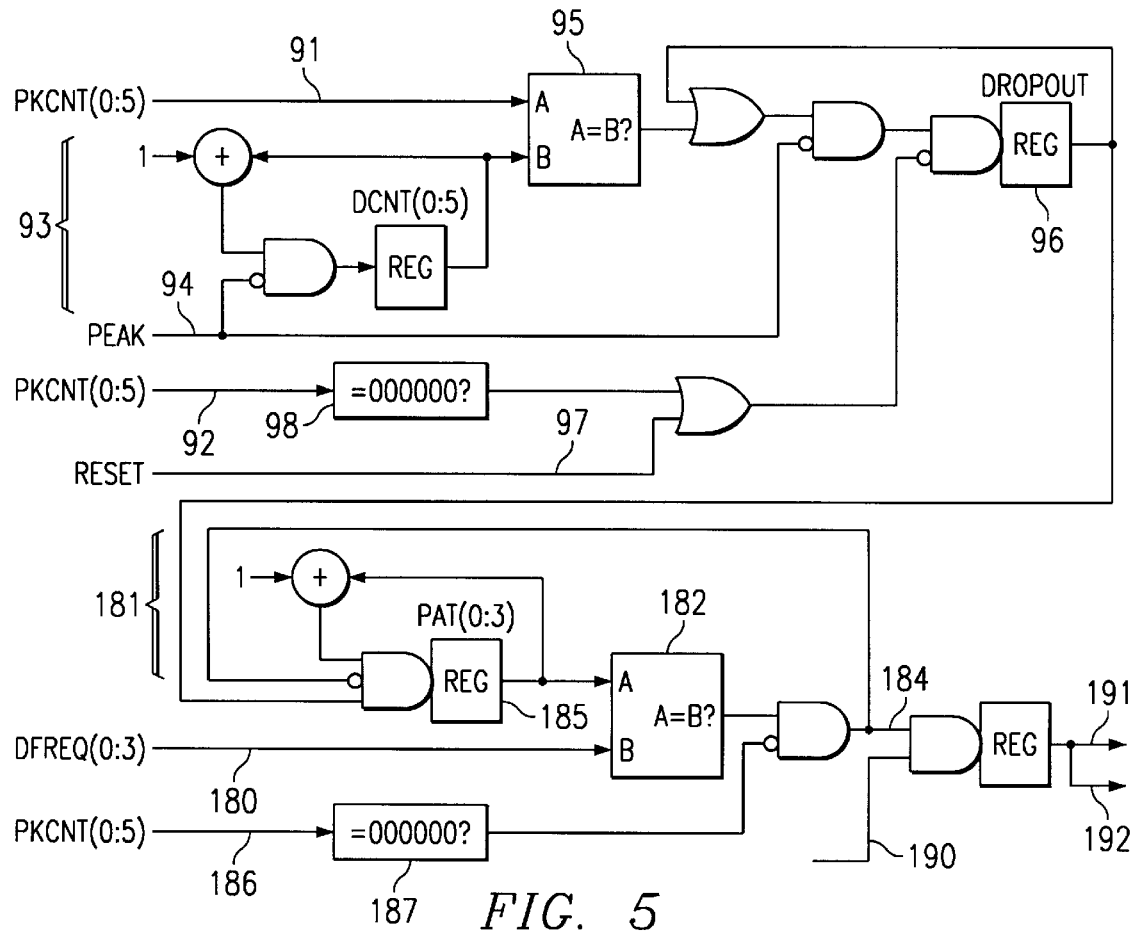
FIG. 5 is a block diagram of an anti-hang arrangement of the present invention.

Since the circuitry described above can get "hung" if severe data offsets occur, "decrement" circuit of FIG. 5 can be added to the envelope followers to automatically discharge the envelope followers if a peak has not been observed over a period of time. The magnitude and frequency of the discharge may also be programmable.

Referring to FIG. 5, the programmed timing at which to begin the automatic discharge is set at lines 91 and 92 as a clock count. The thresholds will be decremented if the set number of clock signals is counted by circuit 93 before being reset by the detection of a peak at line 94. If the count of circuit 93 reaches that set on lines 91, comparator 95 will supply a "one" signal to activate "DROPOUT" register 96. Once activated, the occurrance of a peak on line 94 will deactivate the register 96. Also, deactivation will occur upon receipt of a "power on" reset on line 97, or upon setting the programmed timing to "0" at lines 92. Setting the programmed timing to "0" has the effect of deactivating the anti-hang. Specifically, comparator 98 compares the set timing signal to "0", and, upon the occurrence of a match, provdes a signal to deactivate register 96.

The programmed frequency of discharge is set at lines 180 as a clock count. The thresholds will therefore be discharged a set amount each time the count of circuit 181 reaches that set on lines 180, as indicated by comparator 182, which provides the decrement signal on line 184. The decrement signal also is fed back to clear register 185. As the output signal on line 184 is not latched, it will drop on the next clock cycle, to be provided again upon the count of circuit 181 again reaching that set on lines 180.

The decrementing output will also be deactivated upon receipt of the "0" set timing signal at lines 186, as measured by comparator 187.

The decrementing output on line 184 causes the set decrement value on lines 190 to be deducted from the positive envelope follower in block 60 of FIG. 3 and in block 74 in FIG. 4 at lines 191 and added to the negative envelope follower at lines 192. Thus, the decrement value is deducted from both the tracking thresholds and the clamps.

The digital circuitry described above may be implemented in hard wired circuitry, may be implemented in special purpose processors, or may be implemented in high speed general purpose programmed processors.

Figure 6:
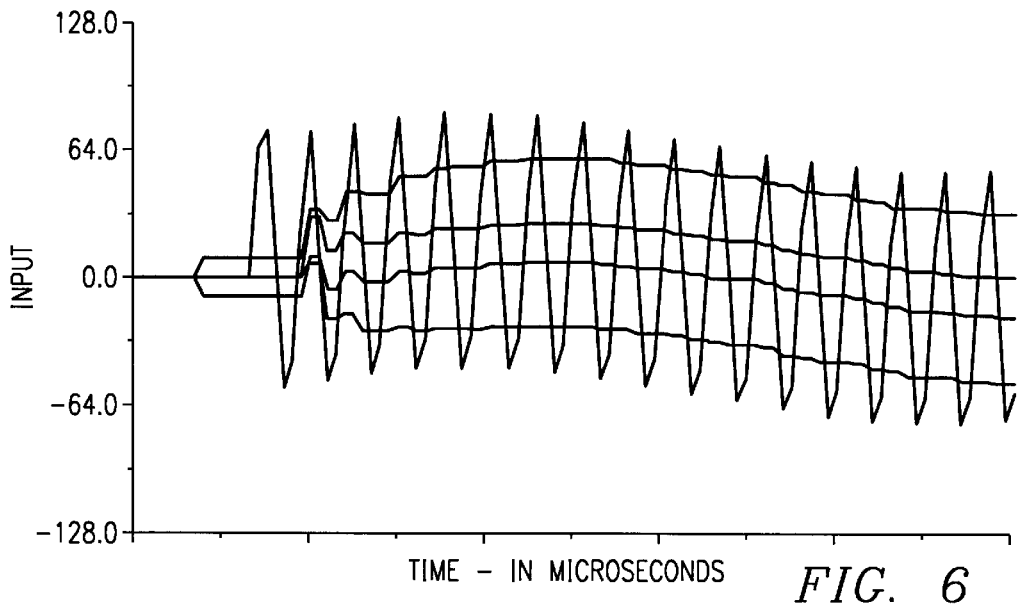
FIGS. 6 and 7 are illustrations of input and output waveforms of a tracking threshold follower provided in accordance with an embodiment of the present invention.
Figure 7:
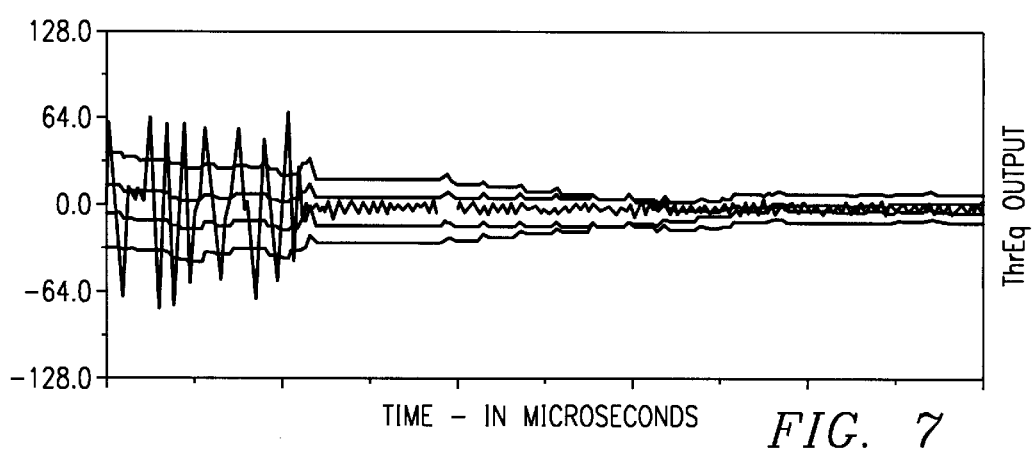

FIGS. 6 and 7 are illustrations of input and output waveforms of a tracking threshold follower provided in accordance with an embodiment of the present invention, as described above.

FIG. 6 illustrates an input waveform and the resultant threshold tracking threshold value and clamp waveforms, where the input waveform begins from zero and shows the acquisition rate and subsequent envelope following of the invention.

FIG. 7 illustrates an input waveform and the resultant threshold tracking value and clamp waveforms, where the input waveform goes to zero after a series of pulses, shows the decay rate and operation of the clamp, and shows the anti-hang decrement operation in accordance with the invention.

The envelope tracking threshold circuitry and method described above is particularly suitable for the sensing of data stored on magnetic media, such as tape. The data is typically recorded on magnetic media in the form of transitions from one magnetic state to the other, with the result that the detected input signal is in the form of alternating positive and negative peaks, as described above.

Optical data is typically stored in the form of non-reflective spots on a reflective media, or in the form of reflective spots on a light absorbent media. In pulse position modulation (PPM) recording, all the spots are about the same size and the data comprises the position of the spots. In pulse width modulation (PWM) recording, the spots are of different sizes, and the data comprises the lengths of the spots.

The sensed data therefore comprises signals indicating that the data sensor is illuminated by light reflected from the storage media, and not the transitions.

The envelope tracking threshold circuitry and method described above will work for PPM optical data, but for the detection of PWM data and the best way to detect the PPM data is to set a single tracking threshold at the centerline of the envelope. The centerline may also be termed the midpoint between peaks, but the terminology centerline is used here to avoid confusion with the mid-point calculation used to establish the clamping levels, above.

Figure 8:
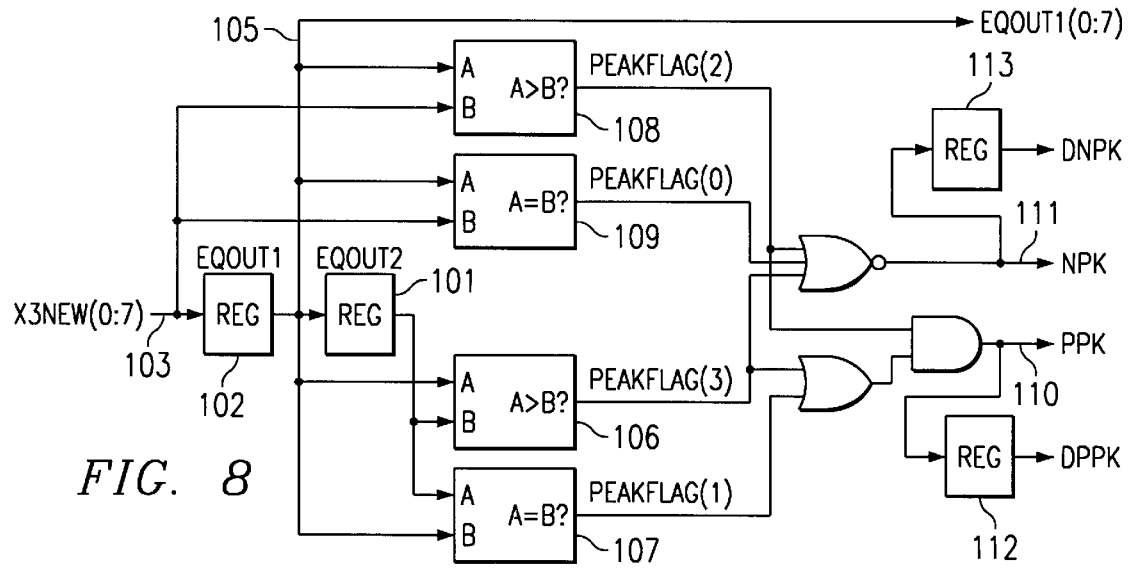
FIG. 8 is a block diagram of a peak identification circuit.

FIG. 8 comprises peak identification circuitry which determines if a positive or negative peak has occurred.

Sets of lines for the digital representations of three consecutive samples of an input signal are shown. The earliest sample is stored in register 101, the current sample (the sample being examined) is stored in register 102, and the most recent sample is provided on lines 103.

The current sample in register 102 is also provided on lines 105 for further processing as will be described.

Comparators 106 and 107 compare the earliest sample to the current sample and indicate whether the amplitude of the current sample A is greater than (circuit 106) or equal to (circuit 107) the earliest sample B. Comparators 108 and 109 compare the most recent sample to the current sample and indicate whether the amplitude of the current sample A is greater than (circuit 108) or equal to (circuit 109) the most recent sample B.

Each comparator sets the appropriate flag, and the flags are decoded by the illustrated logic to indicate if the current sample on lines 105 is a positive peak by providing a signal on line 110, or to indicate if the current sample is a negative peak by providing a signal on line 111. The signals may be delayed in registers 112 or 113 for one clock period.

The peak identifier of FIG. 8 is particularly suitable for optically stored data due to the possible time periods between transitions to or from the illuminated or non-illuminated states, which are detected as the A=B states of circuits 107 and 109.

The identical peak identifier is also appropriate for the magnetic transitions with respect to FIGS. 1–5.

Figure 9:
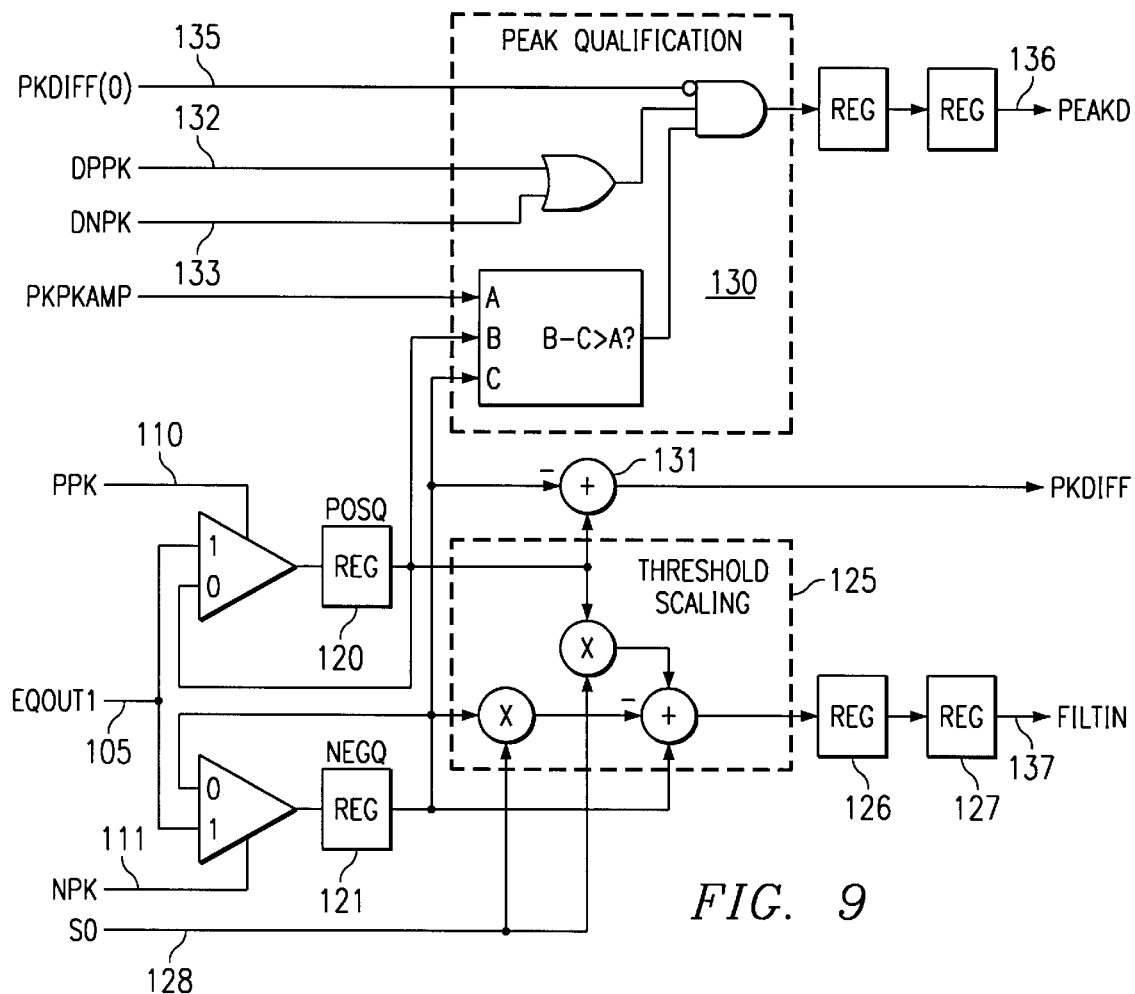
FIGS. 9 and 10 are block diagrams of a programmable digital centerline tracking threshold follower of the present invention.
Figure 10:
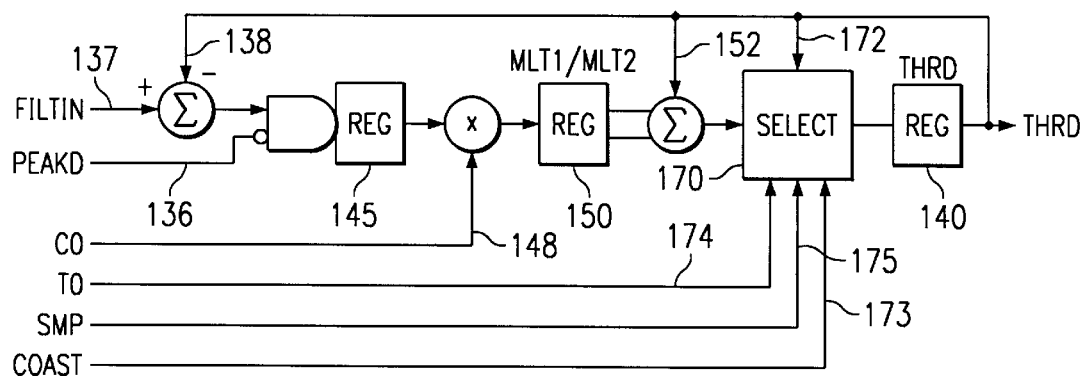

FIGS. 9 and 10 provide an embodiment of the present invention specifically adapted to the sensing of optical data.

With reference to FIG. 9, the results of the peak processing logic of FIG. 8 provides inputs to logic in FIG. 9 that is used to estimate the signal centerline. If a positive peak occurs on lines 105, the positive peak signal on line 110 causes it to be latched and held in one set of registers 120. If a negative peak occurs on lines 105, the negative peak signal on line 111 causes it to be latched and held in another set of registers 121.

The centerline of the peak-to-peak envelope is generated by block 125 according to the equation NEGQ+A(POSQ−NEGQ), where A is a centerline scaling factor provided on line 128. If A equals 0.5, then the centerline estimate is set at the midpoint between the two registers. If A equals 0.75, then the centerline estimate is set three quarters of the way up between the two registers. The midpoint is the normal setting, and the preferred range is between 0.375 and 0.625.

The centerline estimate is latched first in register 126 and then in register 127 for a two clock cycle delay to match additional processing.

Thus, the circuitry of FIG. 9 provides centerline tracking for the input signal.

Still referring to FIG. 9, it is important that a centerline estimate is generated only when a valid positive peak or valid negative peak are stored in the registers. It is the purpose of the peak qualification logic 130 and calculation circuit 131 to determine if the registers 126 and 127 contain valid data.

A valid peak occurs if: 1. a positive peak or negative peak occurs (an identified positive peak signal is provided on line 132 from register 112 from FIG. 8, and an identified negative peak signal is provided on line 133 from register 113 from FIG. 8); 2. the distance between the positive peak and negative peak is greater than PKPKAMP (PKPKAMP is a programmable value that is set to remove the effects of "shouldering" around the peaks); and 3. the positive peak must be greater than the negative peak (shown as PKDIFF providing a "0" as the most significant bit output of calculation circuit 131 if the positive peak is greater than the negative peak and a "1" if the output is negative). The "0" most significant bit or sign bit of calculation circuit 131 is provided as PKDIFF to line 135 as an input to peak qualification block 130.

If the qualifier PEAKD is generated on line 136, then the centerline estimate of register 127 on FILTIN lines 137 is used to generate an error signal. Otherwise, no error signal will be generated.

This is illustrated with further reference to FIG. 10, which comprises a tracking threshold filter. The current value for the tracking threshold from register 140 is subtracted from the centerline estimate on line 137 to generate an error signal. The error signal is gated with the qualifier from line 136 and latched in register 145. The digital error value is multiplied by a programmable gain factor from line 148 and latched into register 150. The gain factor on line 148 is programmable and can be changed dynamically to provide an acquisition gain or a tracking gain.

The multiplied error in register 150 is summed with the current tracking threshold value from register 140 on line 152 and passed to register 140, updating the tracking threshold with a new tracking threshold value. Thus, if a positive error is generated, then the tracking threshold is moved up, and if a negative error is generated, then the tracking threshold is moved down.

This architecture of FIG. 10 is the same as shown in FIG. 2, blocks 36 and 38.

Still referring to FIG. 10, select box 170 provides a number of ways to programmably initialize or control the content of the tracking threshold register 140. These include: coasting at the present tracking threshold value by using the present value from lines 172 in response to a signal on line 173; initialization for sector mark detection by providing a digital initial tracking threshold on lines 174 in response to a signal on line 175; and selecting a tracking threshold of "zero" at system reset (not shown).

For the detection of PWM data, the tracking threshold provided in register 140 is used, not to qualify input peaks, but rather to detect data. The crossing of the threshold is the event that is used to detect "ones" written on the media.

For the detection of PPM data, the threshold is used as with respect to the circuitry and method of FIGS. 1 through 4 to qualify peaks, with unipolar peaks being used to detect "ones" written on the media. In the typical case, the data pulse is detected as a positive pulse, and the absence of data is detected as "zeros".

While the preferred embodiments of the present invention have been illustrated in detail, it should be apparent that modifications and adaptations to those embodiments may occur to one skilled in the art without departing from the scope of the present invention as set forth in the following claims.

We claim:

1. A centerline tracking threshold device responsive to input peak signals for generating a threshold signal at a programmed centerline level comprising:

a digital envelope follower for providing separate positive and negative digital envelope signals of the respective digital positive and negative peak input signals;

a programmable digital centerline generator for setting a centerline at a value scaled at a programmed level between said positive and negative digital envelope signals, wherein said digital centerline generator sets said centerline value according to the following formula:

$$NEGQ+A(POSQ-NEGQ)$$

wherein NEGQ is a negative peak signal value, A is a programmed centerline scaling factor, and POSQ is a positive peak signal value; and a programmable digital threshold follower multiplying the difference between said centerline value and a present threshold value by a programmed centerline following gain to generate a new threshold value.

2. A method, responsive to receipt of input peak signals, for generating centerline tracking threshold signals, comprising the steps of:

providing respective positive and negative digital peak input signals of the amplitude of positive and negative peak of said input peak signals;

providing a programmed centerline scaling factor;

calculating a centerline value scaled by said scaling factor between the values of said respective positive and negative digital peak input signal, wherein said centerline value is calculated according to the following formula:

$$NEGQ+A(POSQ-NEGQ)$$

wherein NEGQ is a negative peak signal value, A is said programmed centerline scaling factor, and POSQ is a positive peak signal value;

providing a programmed centerline following gain; and multiplying the difference between said centerline value and a present threshold value by said programmed centerline following gain to generate a new threshold value.

* * * * *